United States Patent Office 3,428,027
Patented Feb. 18, 1969

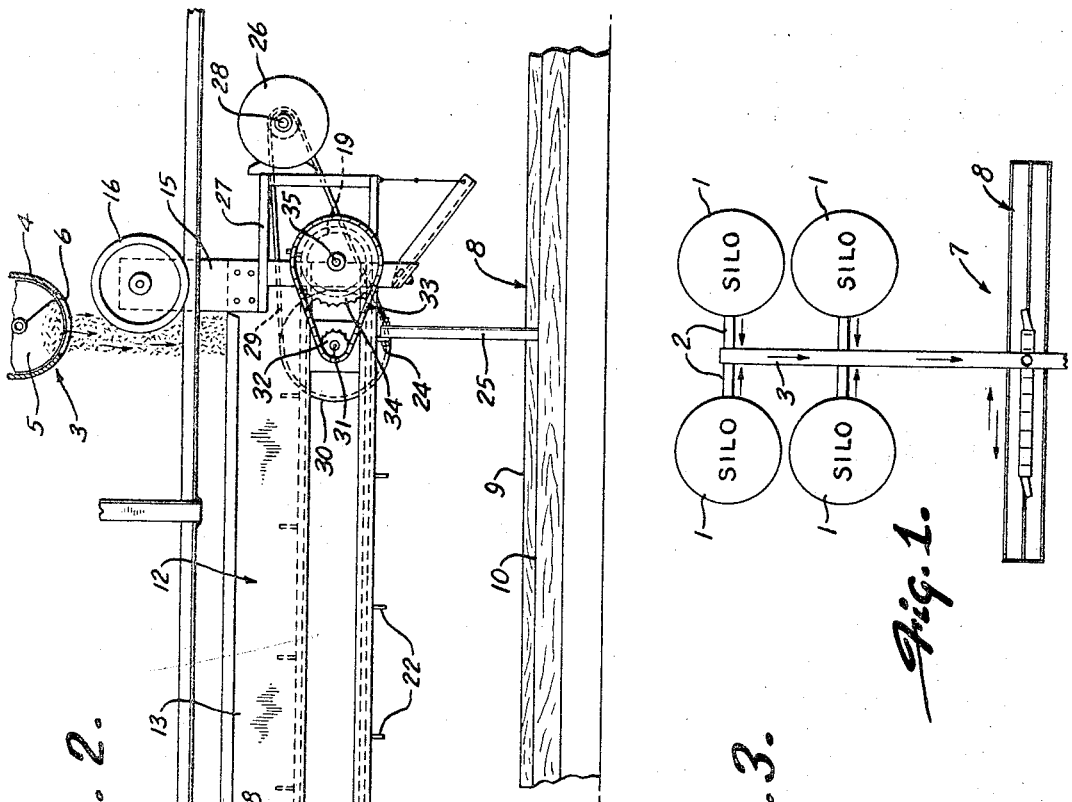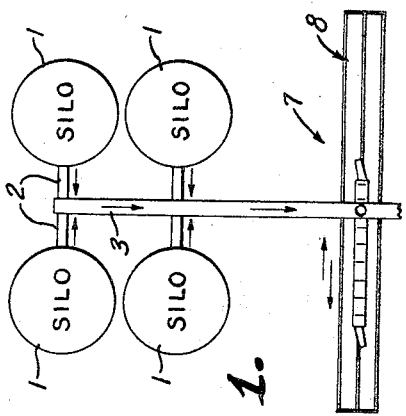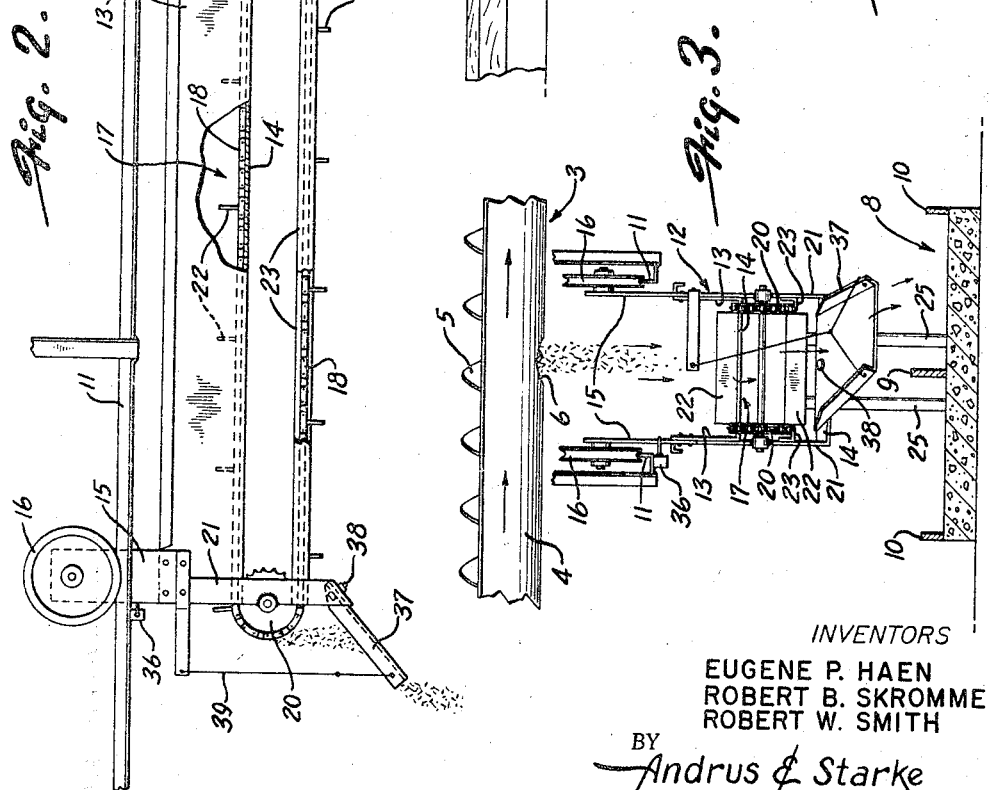
INVENTORS
EUGENE P. HAEN
ROBERT B. SKROMME
ROBERT W. SMITH
BY *Andrus & Starke*
ATTORNEYS

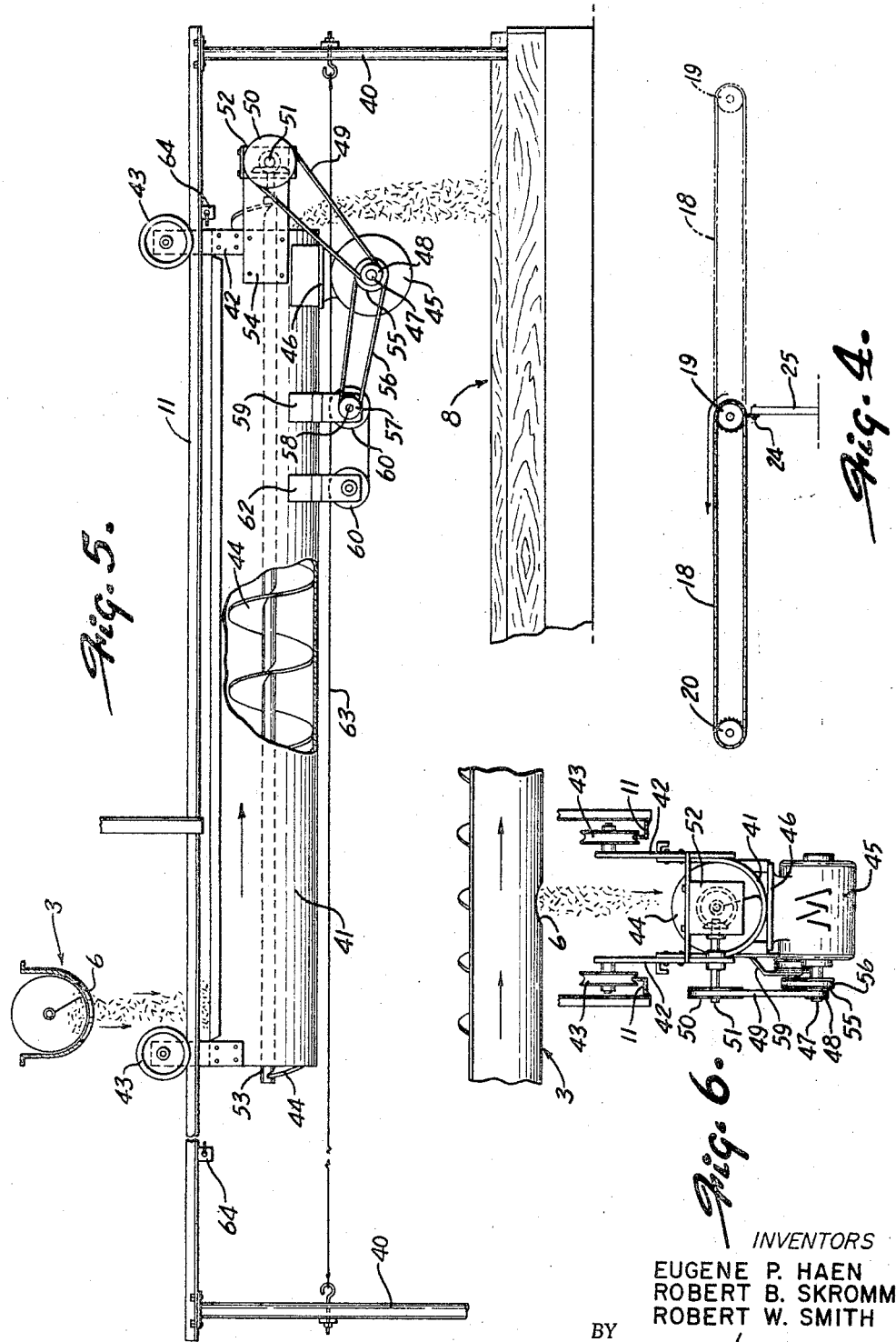

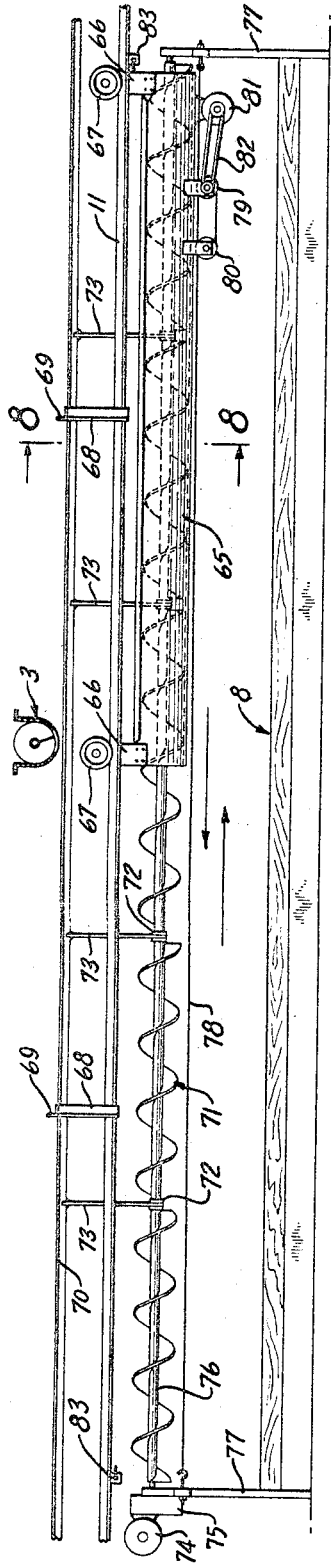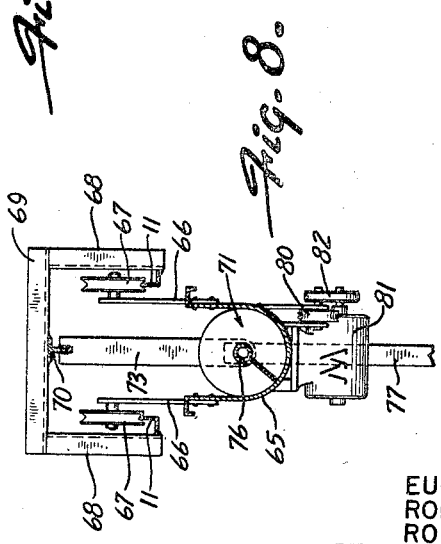

3,428,027
LIVESTOCK FEEDING APPARATUS
Eugene P. Haen, Robert B. Skromme, and Robert W. Smith, Kaukauna, Wis., assignors to Badger Northland Inc., Kaukauna, Wis., a corporation of Delaware
Continuation of application Ser. No. 452,217, Apr. 30, 1965. This application July 24, 1967, Ser. No. 655,671
U.S. Cl. 119—52             5 Claims
Int. Cl. A01k 5/00; B65g 47/44, 23/00

ABSTRACT OF THE DISCLOSURE

A livestock feeding apparatus for continuously distributing feed material from a relatively fixed continuous flow central delivery point outwardly from said point over an elongated feeding area, comprising a longitudinal track extending over substantially the length of said elongated feeding area, a carriage assembly, suspension means supporting said carriage assembly from said track for free movement along the length of the track, said suspension means including spaced support members extending upwardly from the longitudinal sides of said carriage assembly and carrying rollers that ride on said track, said carriage assembly including material holding means extending substantially along the length of said carriage and being open at each end thereof, reversible conveyor means carried by said carriage assembly independent of said suspension means for moving material from said holding means off one end or the other of the carriage assembly.

---

This application is a continuation of application Ser. No. 452,217, filed Apr. 30, 1965, now abandoned.

This invention relates to a livestock feeding apparatus and more particularly to a livestock feeding apparatus using a movable feed trough.

In many livestock feeding systems the feed is conveyed automatically from a silo or other storage structure to a livestock feeding area. The usual feeding unit utilizes an auger or spiral flight to convey the feed within a conveyor housing. In some feeders the conveyor housing is provided with a series of openings spaced along the bottom of the housing and the feed is progressively discharged through the openings in the conveyor housing to the feed area. In other types of feeders the conveyor housing is provided with a continuous opening which extends along the bottom of the housing and the feed conveyed by the auger is discharged through the opening onto a board or feed distributing member which is located above the feed area. When the entire length of the feed distributing member is filled with feed it is dumped so that the feed is distributed simultaneously along the entire length of the feeding area.

The present invention is directed to an improved livestock feeder which utilizes a movable feed trough containing a conveying member. More specifically, the livestock feeder includes an elongated feed trough having an open top to receive feed and a closed bottom and open ends. The trough is mounted for reciprocating movement above the feeding area on a guide track and the trough has a length approximately equal to one-half the length of the track. A fixed feed supply member is positioned generally at the midpoint of the track above the path of travel of the trough and feed is continuously discharged from the feed supply member into the trough as it moves in its reciprocating path of travel. A conveying member is located within the trough and operates continuously relative to the trough to discharge the feed from one of the open ends of the trough.

When the trough reaches an end point in its reciprocating path of travel the drive mechanism is reversed to move the trough in the opposite direction and also to reverse the direction of movement of the conveyor so that feed will then be discharged from the opposite open end of the trough to the feed area. This reciprocating movement of the trough and reversal of the conveyor is repeated with the trough moving back and forth beneath the feed supply member and feed being continuously discharged by the conveyor from either end of the trough to the feed bunk beneath.

In the conventional auger type feeder, fine material will be discharged through the openings in the auger housing at a location close to the feed supply, while the coarse or rough material will be carried on to the end of the conveyor. With the present invention a minimum of separation occurs because the feed is discharged only from the ends of the trough and not through openings in the bottom of the conveyor.

The feed trough or carrier of the invention is of simple construction having few moving parts and has a very low power requirement. For example, the feed trough and conveyor can be powered by a ½ HP motor, where the usual type of conveyor of similar capacity would require a 3 to 5 HP motor.

With the conventional auger-type conveyor the auger is of the same length as the feed bunk. However, with the present invention the trough and conveying member need only be one-half, or less, the length of the entire feed bunk.

As the conveying member which is located within the trough is operating continuously, feed is continuously discharged to the feed area, and this eliminates the need for any feed dumping mechanism.

Other objects and advantages will appear in the course of the following description:

The drawings illustrate the best mode presently contemplated of carrying out the invention.

In the drawings:

FIG. 1 is a schematic representation of a barnyard installation employing a livestock feeder of the invention;

FIG. 2 is a side elevation of the livestock feeder with parts broken away in section;

FIG. 3 is an end view of the feeder shown in FIG. 2;

FIG. 4 is a schematic representation showing the reciprocating path of travel of the trough;

FIG. 5 is a side elevation with parts broken away in section of a modified form of feeder;

FIG. 6 is an end view of the feeder shown in FIG. 5;

FIG. 7 is a side elevation of a second modified form of feeder of the invention;

FIG. 8 is a transverse section taken along line 8—8 of FIG. 7;

FIG. 1 shows a barnyard installation including four silos which are adapted to cointain a livestock feed, such as corn silage, grass silage and the like. The feed is conveyed from each of the silos by a conveyor 2 which discharges the feed into a main conveyor 3. The conveyor 3 may be any type of conventional conveyor such as an auger conveyor which is normally used to convey feed material. As best shown in FIG. 2, the conveyor 3 includes a conveyor housing 4 and an auger 5 which rotates and conveys feed through the housing. The housing is provided with a series of openings 6 each of which is located above a feeding unit 7 so that feed is continuously discharged through each of the openings 6 to the respective feeding unit. While FIG. 1 shows only a single feeding unit 7, it is contemplated that a series of feeding units may be employed with feed being discharged through each of the openings 6 to the respective feeding unit.

Each of the feeding units 7 includes an elevated concrete feed bunk 8 having a central longitudinal divider wall 9 and a pair of side walls 10 which extend upwardly from the side edges from the feed bunk 8.

A pair of guide rails 11 are suspended from a supporting structure, not shown, and are located above the feed bunk 8 and a feed-receiving trough 12 is supported from the rails 11. The trough 12 has an open top, a closed bottom and open ends and includes a pair of generally parallel side walls 13 which are connected together by a bottom wall 14. To support the trough 12 from the rails a series of brackets 15 extend upwardly from side walls 13 and carry wheels 16 which ride on the rails 11.

A conveyor 17 is located in the trough 12 and is operated within the trough to move feed in the same direction as trough movement. The conveyor 17 comprises a pair of endless chains 18 which are engaged with drive sprockets 19 and idler sprockets 20 journaled within brackets 21 located at the ends of the trough 12. A series of cleats 22 are secured between the chains 18, and as the cleats 22 move with the chains 18 within the trough, the cleats engage and convey the feed out of the open end of the trough. A pair of angle bars 23 are secured to the brackets 21 beneath the trough 12 and serve as guides for the chains 18.

A link or section of each of the chains 18 is fixed with respect to the feed bunk. In this regard, a lug 24 is welded or otherwise secured to a link of each chain 18 and each lug is mounted on a vertical post 25 which extends upwardly from the feed bunk. With this construction the link of chain 18 which is secured to lug 24 is fixed and will retain its position relative to feed bunk 8 as the trough reciprocates.

To drive the conveyor 17 and simultaneously drive the trough 12, a motor 26 is mounted on a frame 27 attached to one end of the trough 12. The motor drive shaft 18 is connected by a belt 29 to a pulley secured to shaft 31 which is journaled within the side walls of the trough 12. The shaft 31 also carries a sprocket 32 which is connected by a chain 33 to a sprocket 34 on shaft 35. Shaft 35 is journaled within the side wall of the trough and also carries the chain drive sprocket 19. With this connection the rotation of the motor drive shaft 28 is transmitted through the belt drive 29 and chain drive 33 to drive the chain sprocket 19 at a reduced rate of speed.

As previously mentioned, the trough 12 and the conveyor 17 both have a length approximately equal to one-half the length of the feed bunk. Feed is continuously supplied from the main conveyor 3 into the open top of the trough 12 and operation of the motor 26 acts to drive the conveyor 17 within the trough 12 as well as move the trough along the guide tracks 11. The trough 12 and conveyor 17 are an integral unit, and as a link of each chain 18 is fixed to the feed bunk by connection of the lug 24 to the post 25, movement of the sprockets 19 in the direction of the solid arrow as shown in FIG. 4, will move the trough and conveyor bodily to the position shown in the full lines. When the operation of the motor 26 is reversed, the sprockets 19 will move in the opposite direction to move the trough 12 and conveyor 17 to the position shown in the phantom lines in FIG. 4. While the trough is moving from the position shown in the full lines to the phantom lines in FIG. 4 feed is continuously being introduced into the open top of the trough by the conveyor 3, and simultaneously, the conveyor 17 is operating to continuously discharge feed from the forward end of the trough, in the direction of trough movement.

To provide a uniform distribution of feed throughout the entire length of the feed bunk, the speed of travel of the conveyor 17 relative to the trough should be equal to the speed of travel of the trough relative to the feed bunk. In this way feed will be deposited in the feed bunk at the same rate that it is deposited into the trough 12. For example, if the trough is moving at a speed of 50 ft./min. with respect to the feed bunk, the conveyor should move at a speed of 50 ft./min. with respect to the trough, or, if the conveyor is moving in the same direction as the trough, the conveyor will move at a speed of 100 ft./min. with respect to the feed bunk.

This relationship is inherently maintained by the construction shown which utilizes the lug 24 and part 25 as a means for imparting bodily motion to the trough.

The movement of the trough 12 and the conveyor 17 is reversed by a pair of limit switches 36 which are located at the ends of the feed bunk. As shown in FIG. 2, when the trough 12 reaches the end of the feed bunk the bracket 15 engages the limit switch 36 which acts through a conventional latching relay to reverse the motor 26 and thereby operate the sprockets 19 in the opposite direction which serves to move the trough 12 in the opposite direction. When the trough reaches the opposite end of the feed bunk it engages the other limit switch 36 which again reverses its path of travel so that the trough 12 will move continuously in a reciprocating or shuttling path of travel along the feed bunk.

To distribute the feed to either side of the divider board 9, a spout 37 is supported on the horizontal portion of bracket 21 at each end of the trough. Spout 37 is mounted for horizontal pivotal movement about a pin 38 which extends upwardly from the bracket. A cable 39 can be attached to the spout to maintain the spout at the desired angle to the horizontal. The spout 37 can be readily pivoted in a horizontal plane so that the feed can be distributed to one side or the other of the central divider wall 9.

FIGS. 5 and 6 illustrate a modified form of the invention. In this embodiment the guide rails 11 are supported at their ends above the feed bunk 8 by a series of vertical supports 40 and are also suspended intermediate their ends from a suitable supporting structure, not shown. A generally U-shaped trough or housing 41 is mounted for reciprocating movement on the rails 11 and feed is continuously discharged from the main conveyor 3 into the open top of the trough 41. The trough 41 has a length approximately equal to one-half the length of the feed bunk 8.

To support the trough for reciprocating movement, a series of brackets 42 extend upwardly from the ends of the trough and wheels 43 are mounted on the brackets and are arranged to ride on the rails 11.

An auger conveyor 44 is mounted within the trough 41 and is adapted to convey feed in the same direction as trough 41 is moving to thereby discharge feed from the open end of the trough.

The auger 44 is driven by a motor 45 which is mounted beneath one end of the trough 41 by a mounting bracket 46. The motor drive shaft 47 carries a pulley 48 which is connected by a belt 49 to a pulley 50 which is secured to a shaft 51. The shaft 51 is connected through a gear box 52 to the auger shaft 53. The gear box 52 is mounted outwardly from the end of the trough 41 by a suitable frame 54.

In addition to the pulley 48, the motor drive shaft 47 also carries a pulley 55 which is connected by belt 56 to a pulley 57 mounted on shaft 58. The shaft 58 is journaled within a bracket 59 which extends downwardly from the trough 41. The shaft 58 also carries a pulley 60 and a second pulley 61 in journaled on a bracket 62 which extends downwardly from the trough 41 in spaced relation to the bracket 59. A cable 63 is dead-ended on the supports 40 at opposite ends of the feed bunk and is reaved around pulley 60 and 61.

With this drive system, rotation of the motor shaft acts through the belt drive 49 and gear box 52 to rotate the auger 44 within the trough 41. Simultaneously, the belt drive 56 rotates the pulley 57 to thereby drive pulley 60 which acts through cable 63 to drive the trough 41 and auger 44 along the guide rails 11.

As in the case of the first embodiment, limit switches 64 are located at opposite ends of the feed bunk, and when the trough 41 approaches the end of the feed bunk the bracket 42 will engage the limit switch which acts through a latching relay to reverse the motor 45 and thereby rotate both the drive pulley 57 and the auger 44 in the opposite direction.

As shown in FIG. 5, the trough 41 is moving in the direction of the arrow and the auger 44 is similarly conveying feed relative to the trough in the direction of the arrows so that feed is being discharged from the right-hand end of the trough 41 as shown in FIG. 5. The auger could well be driven in the opposite direction to discharge feed at the left hand end of the trough 41.

As in the case of the first embodiment, it is important that the linear horizontal component of speed of the conveyor relative to the trough 41 be equal to the speed of the trough 41 relative to the feed bunk 8. With this relationship, feed will be uniformly distributed throughout the entire length of the feed bunk.

FIGS. 7 and 8 illustrate a second modified form of the invention. In this embodiment, a trough 65 is mounted for reciprocating movement on the rails 11 and has a length equal to approximately one-half the length of the feed bunk. The trough 65 is similar to trough 41 having a generally U-shape with an open top and open ends.

To mount the trough 65 for reciprocating movement a series of brackets 66 extend upwardly from the ends of the trough and carry wheels 67 which ride on the rails 11.

In this embodiment the rails 11 are mounted on a series of vertical supports 68 and the upper ends of the supports 68 are secured to cross beams 69 which are mounted on a longitudinal beam 70. The longitudinal beam 70 is located substantially above the longitudinal centerline of the feed bunk and extends the length of the feed bunk.

The feed, which is continuously discharged from the main conveyor 3 into the open top of trough 65, is conveyed or moved within the trough 65 by an auger conveyor 71. In this embodiment the auger 71 extends the length of the feed bunk, having a length approximately equal to twice the length of the trough 65. Except for rotation, the auger 71 does not move relative to the feed bunk and the trough 65 reciprocates relative to the fixed auger. The auger 71 is journalled for rotation within a series of bearings 72 which are supported by supports 73 from the longitudinal beam 70.

The auger is driven by a motor 74 which is connected through a speed reducing transmission 75 to the auger shaft 76. The motor 74 and transmission 75 are supported on a pair of vertical end posts 77 which extend upwardly from the end of the feed bunk 8.

The trough 65 is reciprocated along the rails 11 and moves relative to the auger 71 by a cable drive similar to that shown in the embodiment of FIGS. 5 and 6. In this regard, a cable 78 is dead-ended on the end posts 77 and is reaved over pulleys 79 and 80 which are secured to the trough 65. Pulley 79 is driven by a motor 81 acting through a belt drive 82 in a manner similar to that described with respect to the embodiment of FIG. 5.

As in the case of the previous two embodiments, a pair of limit switches 83 are located at opposite ends of the feed bunk and are operably connected through a suitable electric circuit to the auger motor 74 and to the cable drive motor 82. When the trough 65 reaches an end of the feed bunk, the trough engages the respective limit switch 83 to thereby reverse the motors 74 and 82. Reversing the motor 82 will move the trough 65 in the opposite direction relative to auger 71, and reversing motor 74 will drive the auger in the opposite direction.

The structure shown in FIGS. 7 and 8 operates in a manner similar to the previous embodiment. The feed is continuously discharged from the conveyor 3 into the open top of the reciprocating trough 65. The auger 71 is rotating in a direction to convey feed in the same direction as movement of the trough. As in the previous embodiments, it is important that the linear horizontal component of speed for the auger 71 relative to the trough is equal to the speed of the trough relative to the feed bunk to provide a uniform distribution of feed to the feed area.

While FIG. 1 shows a single feeding unit 7 being employed, it is contemplated that one or more feeding units may be used, depending upon the size of the feed area and the number of livestock to be fed.

Similarly, while the drawings illustrate the feed units as being straight in shape and the troughs moving in a reciprocating path, it is contemplated that the guide tracks 11 could be circular or have other shapes and the troughs would have a corresponding shape. Any type of feed supply member can be used to supply feed to the trough. For example, a hopper, chute, elevator, or the like, can be used in place of the conveyor 3. Feed can be discharged directly from the storage structure or silo to the feed supply member, or as shown in the drawings, the feed can be conveyed through a conveying system before entering the feed supply member.

Normally, the conveyor will move in the same direction as trough movements. However, in some cases the conveyor can move relative to the trough in a direction opposite to the direction of trough movement and the feed will be discharged in a like manner to the feed area.

As the trough into which the feed is introduced from the main conveyor has a closed bottom, the feed is discharged only from the ends of the trough, separation of the rough and fine materials is minimized, and this results in a more uniform distribution of the various types of feed throughout the entire length of the feed bunk.

As the feed trough itself is being moved while the feed is being conveyed within the trough, the frictional resistance is substantially reduced and considerably lower power requirements are needed for a given feeding capacity.

As the conveyor is operating within the trough while the trough is reciprocating, the feed is discharged from the ends of the trough continuously and this eliminates the necessity for having a dumping mechanism to dump the feed from the trough at various locations in the path of travel.

Various modes of carrying out the invention are contemplated as being within the scope of the following claims particularly pointing out and distinctly claiming the subject matter which is regarded as the invention.

We claim:

1. Livestock feeding apparatus for continuously distributing feed material from a relatively fixed continuous flow central delivery point outwardly from said point over an elongated feeding area, comprising a longitudinal track extending over substantially the length of said elongated feeding area, a carriage assembly, suspension means supporting said carriage assembly from said track for free movement along the length of the track, said suspension means including spaced support members extending from the longitudinal sides of said carriage assembly and carrying rollers that ride on said track, said carriage assembly including material holding means extending substantially along the length of said carriage and being open at each end thereof, reversible conveyor means carried by said carriage assembly independent of said suspension means for moving material from said holding means off one end or the other of the carriage assembly, said conveyor and holding means having a length equal to approximately one-half the length of said area, said conveyor comprising a chain and slat assembly, reversible driving means for moving both said conveyor in one direction or the other and simultaneously moving said carriage back and forth along the track, control means for reversing said driving means when engaged by said support members when the carriage is at either end of said elongated area, material supply means located substantially near the center of the area and above said carriage while continuously depositing bulk material on said material holding means, and one element of said chain and slat assembly lying under said feed material holding means in a central location under said supply means connected to a fixed point in said elongated area so that the element is held substantially under said feed material supply means whereupon operation of said driving means and chain and slat means will cause said carriage assembly to bodily move away from said central location while independently suspended from said track by said suspension means.

2. The livestock feeding apparatus of claim 1 wherein said material holding means comprises a trough having a bottom and side walls and wherein said conveyor acts to scrape the bulk material off one end or the other of said trough bottom.

3. The livestock feeding apparatus of claim 1 wherein said carriage assembly includes a plurality of sprocket wheels rotatably carried on transverse axes at each end of the material holding means and wherein said chain and slat assembly is entrained around said sprocket wheels and said material holding means, the slats of said slat assembly acting to scrape material off of one end or the other of said material holding means depending on the direction of movement of said slat assembly.

4. The livestock feeding apparatus of claim 3 wherein said driving means comprises a motor carried by said carriage assembly and connected to drive said chain and slat assembly around said material holding means in either direction and wherein said bodily movement is in the same direction as the portion of the chain and slat assembly above the material holding means is moving.

5. The livestock feeding apparatus of claim 1 wherein said support members extend upwardly from the longitudinal sides of said carriage assembly and carry said rollers that ride on said track.

References Cited
UNITED STATES PATENTS

| | | | |
|---|---|---|---|
| 1,086,522 | 2/1914 | Gilman | 198—67 |
| 2,873,037 | 2/1959 | Fischer | 214—17 |
| 3,217,693 | 11/1965 | Loesch et al. | 119—56 |
| 883,801 | 4/1908 | Harpstrite | 198—67 |
| 1,547,686 | 7/1925 | Rieff | 214—83.36 |

HUGH R. CHAMBLEE, *Primary Examiner.*

U.S. Cl. X.R.

198—67, 110